US005895553A

United States Patent [19]

Spada

[11] Patent Number: 5,895,553

[45] Date of Patent: Apr. 20, 1999

[54] DEVICE FOR APPLYING GLUE TO WRAPPER SHEETS, ESPECIALLY COLD GLUE, IN CIGARETTES PACKAGING MACHINES OR THE LIKE

[75] Inventor: Valter Spada, Marzabotto, Italy

[73] Assignee: Sasib S.p.A., Bologna, Italy

[21] Appl. No.: 08/633,492

[22] Filed: Apr. 17, 1996

[30] Foreign Application Priority Data

May 24, 1995 [IT] Italy .................................. GE95A0060

[51] Int. Cl.[6] ...................................................... B32B 31/12

[52] U.S. Cl. .......................... 156/543; 156/366; 156/578; 156/324; 118/211; 118/244; 118/240

[58] Field of Search ..................................... 156/578, 568, 156/443, 366, 539, 543, 324; 131/69, 284; 118/211, 240, 244

[56] References Cited

U.S. PATENT DOCUMENTS

| | | | |
|---|---|---|---|
| 1,793,082 | 2/1931 | Goss | 118/212 |
| 2,109,647 | 3/1938 | North | 118/249 |
| 2,564,492 | 8/1951 | Moffat et al. | 118/708 |
| 2,782,756 | 2/1957 | Hunt | 118/211 |
| 3,025,830 | 3/1962 | Vierthaler et al. | 118/243 |
| 3,619,328 | 11/1971 | Preston et al. | 131/69 X |
| 3,756,842 | 9/1973 | Meyers et al. | 427/208.2 |
| 4,249,547 | 2/1981 | Hinzmann | 131/69 X |
| 4,865,679 | 9/1989 | Gamberini et al. | 156/497 |

FOREIGN PATENT DOCUMENTS

| | | |
|---|---|---|
| 1052297 | 1/1954 | France . |
| 2 602 484 | 2/1988 | France . |
| 2 666 521 | 3/1992 | France . |
| 1 075 419 | 2/1960 | Germany . |
| 231860 | 12/1925 | United Kingdom . |
| 2 093 739 | 9/1982 | United Kingdom . |
| 2 176 427 | 12/1986 | United Kingdom . |

*Primary Examiner*—Francis J. Lorin
*Attorney, Agent, or Firm*—Larson & Taylor

[57] ABSTRACT

A device for applying glue to wrapper sheets, especially cold glue, in cigarette packaging machines or the like, includes a device (7) for conveying a succession of wrapper sheets (1) through a glue application station in which devices (10) are provided for picking up the glue from a box (9) and applying it to at least certain predetermined areas (201, 301) of the wrapper sheets (1). The glue pick-up/applicator means (10) are brought (14, 15) into contact with the wrapper sheet (1), that is with the corresponding predetermined areas (201, 301) in a punching or touching movement and can move (14, 15), transversely to the surface of the wrapper sheet (1), between an active position of glue application in which the devices (10') are in contact with the predetermined application area (201, 301) of the wrapper sheet (1) and an inactive position in which the pick-up/applicator devices (10) are withdrawn a predetermined distance from it.

16 Claims, 4 Drawing Sheets

DEVICE FOR APPLYING GLUE TO WRAPPER SHEETS, ESPECIALLY COLD GLUE, IN CIGARETTES PACKAGING MACHINES OR THE LIKE

The invention relates to a device for applying glue to wrapper sheets, especially cold glue, in cigarette packaging machines or the like, comprising means for conveying a succession of wrapper sheets through a glue application station in which means are provided for picking up the glue from a glue container and applying it to at least certain predetermined areas of the wrapper sheets, which glue pick-up/applicator means are brought into contact with the wrapper sheet, that is with the corresponding predetermined areas of this sheet in the glue application station.

At present, in devices of the type described above, the means for applying the glue to the predetermined areas of the wrapper sheets, for example to the folding tabs by which they are fixed inside the cardboard blanks to form hard cigarette packets, consist of a plurality of rollers which are basically tangential to the blanks as they advance through the glue application station and which rotate in the direction of advance of the blanks. The rollers are so arranged as to come into contact, at least by means of the glue-carrying sectors, with predetermined areas of the blanks as the latter pass through the glue application station. Co-operating with the glue-carrying segments or sectors of the applicator rollers are means for transferring the glue to these rollers. The rotational driving of the rollers is synchronized with the advance of the blanks, which are in tangential contact with the glue-covered surface of the rollers diametrically opposite the immersed side.

With this kind of glue applicator device there are many problems of soiling because the glue is applied with a rolling action in which the glue-carrying sectors of the pick-up/applicator rollers roll across those areas of the blank where the glue is to be applied.

The amount of glue and the ways in which it is applied, i.e. its distribution over the predetermined areas of the blank, are very important also if glue is not to ooze out during the folding of the blank when the areas to which the glue has been applied are brought into contact with and pressed against the associated areas of the blank to which they are to be fixed.

The ways in which the glue is applied also assume importance in consideration of the fact that packing machines, especially cigarette packaging machines, are run at very high speeds. This means that the rollers are also turning at high speeds and that the glue distributed around their peripheral surfaces experiences a large centrifugal force. The result is that the glue can even be partially sprayed around the environment, making the danger of soiling even greater.

It is an object of the invention to provide a glue applicator device of the kind described at the outset, by means of which it will be possible to overcome the problems described above and achieve perfect distribution of the glue on the wrapper sheets in the predetermined areas only, thereby consuming less glue and generally guaranteeing perfect glue application and avoiding the problems associated with soiling.

The invention achieves these objects by means of a device of the kind described at the outset, in which the glue pick-up/applicator means are of the punch-applying type, that is they can move transversely, that is substantially perpendicularly to the surface of the wrapper sheet, that is of those areas of the latter where the glue is to be deposited, between an active position of glue application in which said means are in contact with the predetermined application areas of the wrapper sheet and an inactive position in which the pick-up/applicator means are withdrawn a predetermined distance from the surface of the wrapper sheet.

By virtue of this arrangement the glue is applied by a perpendicular movement of punching or touching the surface of the wrapper sheet, thus avoiding the problems associated with the rolling or sliding of the sheet over the pick-up/applicator means. The glue consequently remains securely confined within the intended areas and there is no risk of its spreading to surrounding areas.

The pick-up/applicator means may be of any type. The glue pick-up/applicator means consist of glue-carrying dies or punches whose active glue-conveying area is dimensionally limited to a predetermined length in the direction of advance, whereas it can be defined as desired in the transverse direction to the direction of advance of the wrapper sheet. In the device according to the invention the pick-up/applicator means may advantageously take the form of pick-up/applicator rollers positioned opposite the predetermined areas for the application of the glue to the wrapper sheet, the blanks being conveyed in such a way that the areas to which the glue is to be applied are oriented with their longitudinal axes transversely to the direction of advance, and the rollers being able to rotate about axes transverse to the direction of advance, while the applicator/pick-up punches consist of glue-carrying sectors whose arcuate form follows the peripheral surface of the rollers and whose length in the circumferential direction is commensurate with the curvature of the peripheral surface of the roller in such a way that the glue on the circumferential extremities of the glue-carrying sectors comes into contact with the surface of the wrapper sheet, producing on the latter an imprint of glue whose transverse length is approximately equal to that of the glue-carrying sectors and whose axial length is equal to the axial length of the glue-carrying sectors on the rollers.

The glue-carrying sectors may be so formed as to produce an axial row of transverse dashes of glue that are set a predetermined distance apart from each other.

If this is done, the glue-carrying sectors may consist of at least one axial row of peripheral recesses elongated in the circumferential direction. Along the axial length, that is in the transverse direction to the direction of travel of the blank, of the areas to which the glue is applied, the corresponding glue-carrying sector is provided with a corresponding number of recesses which are axially aligned with each other.

The rollers advantageously have a plurality of pick-up/applicator punches in the form of glue-carrying sectors that are angularly equidistant from each other.

In an advantageous embodiment, the pick-up/applicator rollers are provided peripherally with a plurality of rings of glue-carrying recesses, these rings are glue-carrying recesses being set a predetermined and variable distance apart from each other in the axial direction of the roller, the glue-carrying recesses of each ring being equidistant from each other in the circumferential direction and axially aligned with those of the other rings.

The pick-up/applicator rollers are partially immersed in the glue contained in a tank, and the wrapper sheets are passed over the rollers, the latter being able to be raised against said sheets and lowered away from said sheets together with the glue tank.

This is all synchronized with the advancing movement of the succession of wrapper sheets.

The pick-up/applicator rollers can be rotated stepwise in such a way as to be synchronized with each other, with the perpendicular motion of approach and withdrawal and with the advance, or entry, of the wrapper sheets into the glue application station, and such that for each new wrapper sheet the rollers are rotated with a new glue-collecting recess towards the new wrapper sheet.

By means of this arrangement, not only is the glue no longer applied by a rolling action, but also there is no continuous high-speed rotation over the wrapper sheet, because simultaneously and with a single touching movement it is possible to apply a strip of limited width but any length to the wrapper sheet. When it is desired to apply glue to wider areas, that is areas whose dimension in the direction in which the blank is being conveyed is greater, it is possible to repeat the application operation several times while advancing the wrapper sheet a small amount compared with the amount by which the blank sheet is fed in combination with a one-step advance of the rollers and with a movement of approach and withdrawal.

The device according to the invention provides a lower mechanical degradation of the glue.

Further the wrapper sheets advance with an alternative step by step motion. The glue is applyed to the wrapper sheets during the phases between the advancing steps, in which phases said sheets are at rest.

The invention also covers other features which further enhance the above device and are the subject of the dependent claims.

The special features of the invention and the advantages procured thereby will appear in greater detail in a description of a preferred embodiment illustrated by way of a non-restricting example in the accompanying drawings, wherein.

Figure 4:
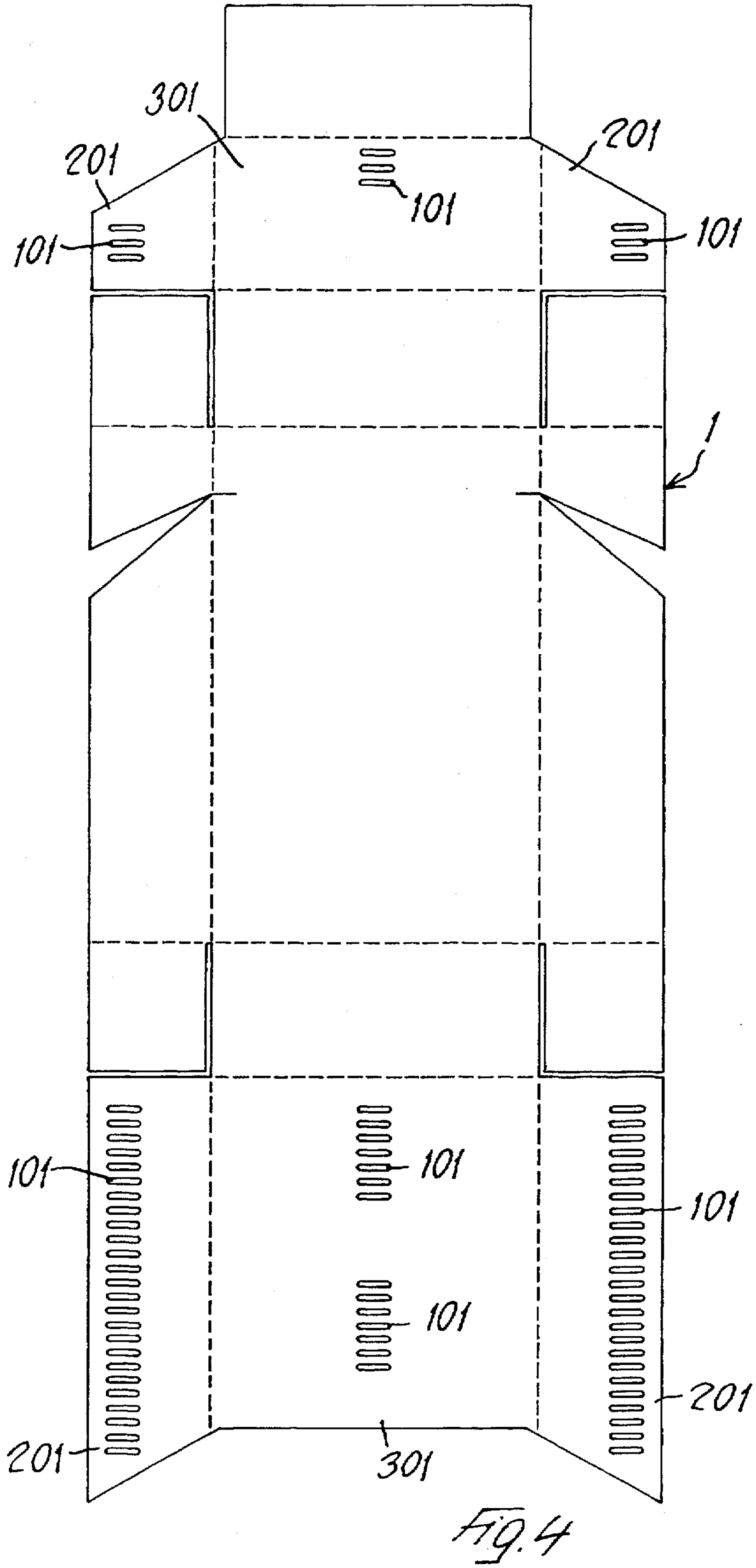
FIG. 4 is a plan view of the blank showing the areas to which the glue is applied in a predetermined design.

With reference to the figures, a device for applying glue to wrapper sheets, in particular to blanks 1 such as that shown in FIG. 4 for making hard packs for cigarettes or the like, comprises a feeder of blanks from a magazine 2 which in the example illustrated is represented by a suction arm 3. A system of cranks 4 and guide levers 5 causes the suction arm to move transversely to its length to withdraw one blank 1 from the bottom of a stack of blanks held in the magazine 2, combined with a forward and backward movement in its longitudinal direction, thereby presenting the collected blank 1 to a first or entry suction drum 6. The entry suction drum 6 is turned about its axis on an end-supported shaft 106 and operates in combination with a second or conveying suction drum 7 which is directly adjacent to it, virtually tangential but separated by a slight distance. The conveying suction drum 7 takes the blank from the entry drum 6 and feeds it into a station where the cold glue is applied. In particular, the conveying drum 7 has at least one suction sector 107, preferably two diametrically opposite suction sectors, possibly also more suction sectors distributed around its periphery; and it is caused to rotate about its axis.

Each suction sector 107 substantially corresponds in area to the area of the blank 1. The suction sectors comprise approximately radial channels 207, preferably arranged in a fan shape, which communicate with a low-pressure chamber 307 connected via a duct 407 to a generator of low and high pressure alternately. A pressure generator is advantageously used, the duct 407 being connected alternately to said generator and to atmospheric pressure by a rotary valve in accordance with the angular position of the suction sector 107. Thus, when it is picking up the blank 1 and when it is in the glue application station, the suction sector 107 is connected to the low-pressure generator, whereas when it is in the discharge station it is connected to atmospheric pressure. In the pick-up station the blank is surrendered by the conveying drum 7 to a discharging conveyor 8, for example by a belt or pair of belts with suction action.

In the glue application station, the suction sector 107 is situated directly above the glue applicator means.

In the example illustrated, these means comprise an open-topped glue tank 9 of which the open top is towards the conveying drum 7, that is towards the suction sector 107 which is temporarily in the glue application station. The tank 9 extends below the entire area of the blank 1 in both the circumferential and axial directions of the conveying drum and the tank walls 109 oriented transversely to the axis of the conveying drum 7 comprise a concavity coaxial with this conveying drum 7. Mounted in these walls are one or more shafts 110 for a plurality of glue pickup/applicator rollers 10. The shafts 110 lie alongside each other and their centers are positioned on an ideal circular line coaxial with the conveying drum 7, that is with the concavity 209. The rollers 10 and shaft 110 correspond in position with the desired areas of application of the glue and all dimensions are such that the rollers 10 are at least partially immersed in the glue on the side away from the conveying drum 7, while the part facing said conveying drum 7 is out of the glue. The top of the tank 9 is closed by a cover 309 which is concave to correspond with the conveying drum 7 and which has slots 409 corresponding in size to the individual rollers 10 and through which there projects at least an angular sector of that part of each roller which is towards the conveying drum 7.

Figure 1:
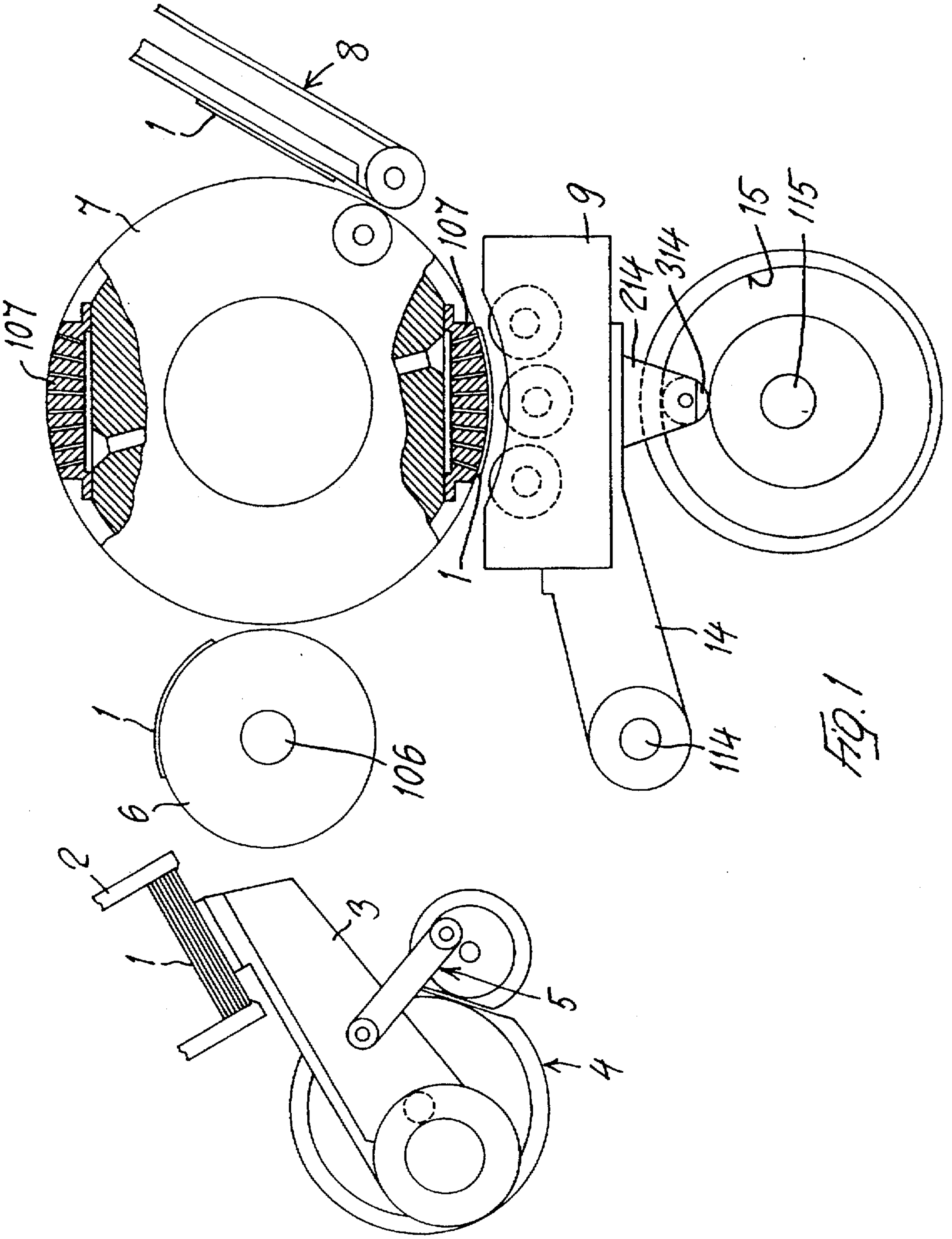
FIG. 1 is a schematic front view, partly in section, of the device according to the invention.
Figure 2:
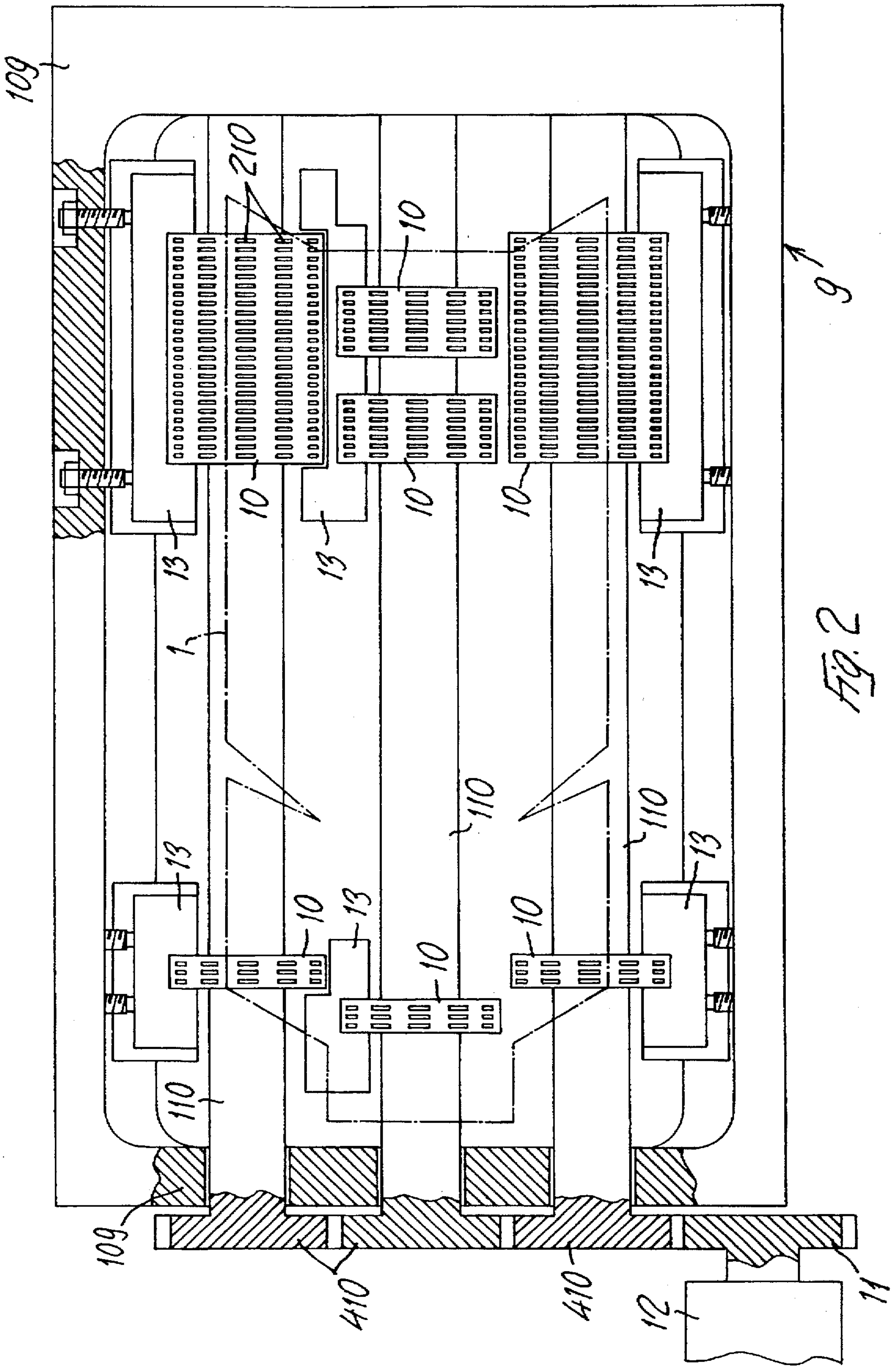
FIG. 2 is an enlarged plan view from above of the glue tank with the pick-up/applicator rollers.
Figure 3:
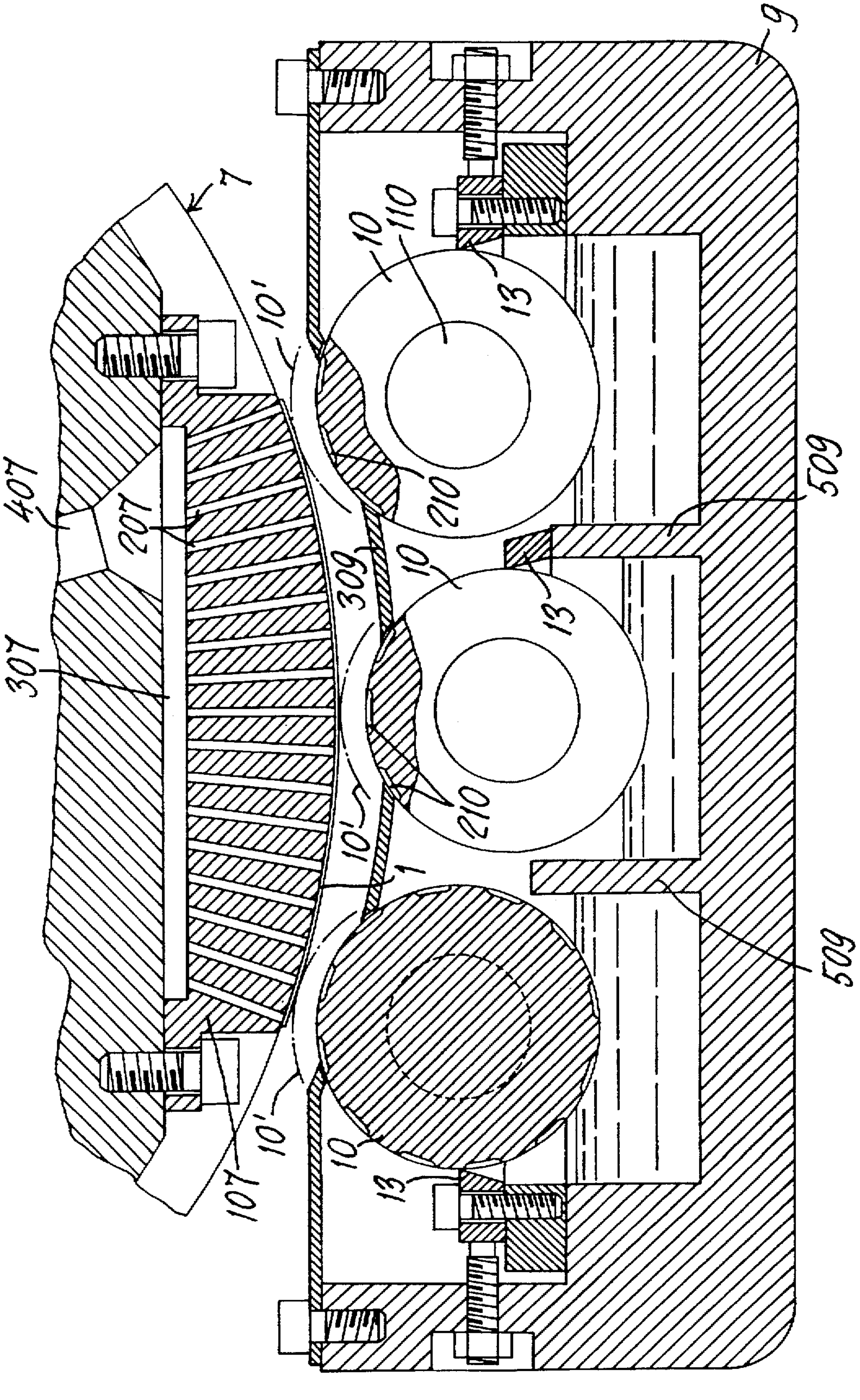
FIG. 3 is an enlarged section of the glue tank with the applicator rollers on a vertical plane.

With reference to FIGS. 2, 3 and 4, each roller 10 is designed to produce an imprint of glue on a predetermined part of the blank 1. This imprint must have predetermined dimensions and comprise a predetermined quantity of glue to avoid soiling. The rollers 10 comprise one or more rings of recesses for collecting the glue. The recesses 210 are elongated in the circumferential direction of the rollers and are angularly equidistant from each other along the rings. The recesses 210 of the rings are axially aligned with each other and the stepwise rotation of the drive shafts 110 is synchronized with the feeding of the blanks, so that new recesses 210, filled with glue, are brought directly opposite and more or less tangential to the blank 1, that is to the predetermined corresponding areas of the blank, as each new blank 1 is fed into the glue application station. In the example illustrated, the shafts 110 have one end that projects out of one of the transverse walls of the tank 9 and rotate in mesh with each other by means of gears 410 keyed onto them and engaging with each other, while one of these gears 410 engages with a gearwheel 11 connected to a drive source 12. The tank advantageously includes scrapers 13 for cleaning the part of the peripheral surface of the rollers 10 coming out of the tank, and these limit the amount of glue inside the recesses 210. Furthermore each shaft 110 may be fitted, at different axial positions along itself, with a plurality of rollers 10, while the tank 9 may be subdivided into a plurality of sectors, each for one shaft 110, by axial dividing ribs 509. The scrapers 13 are advantageously mounted on the axial lateral walls of the tank 9 and on the dividing ribs 509. The tank 9 together with the glue pick-up/applicator rollers 10 is mounted on the free end of an arm 14 which at its other end is hinged at axis 114 in such a way as to be able freely to pivot about an axis parallel with the axis of the drum. The arm 14 includes a downward transverse extension 214 fitted with at least one roller 314 that turns on an axis parallel to the axis of the conveying drum 7 and that runs in a circular cam track 15 which is supported so as to rotate about an eccentric axis 115. The eccentric axis is vertically lower than the axis of the circular cam track 15 in order that the rotation of the cam will cause the tank 9 alternately to rise, bringing the rollers 10 into contact with the conveying drum 7, that is with the blank 1, and then cause it to descend to a position substantially radially distant from said blank 1. The rotary actuation of the cam 15 is synchronized with the feeding of the blanks 1 into the glue application station, in other words with the advancing steps of the entry drum 6 and with those of the conveying drum 7, as well as with the rotary steps of the rollers 10, in such a way that when a new blank is being fed into the glue application station and when it is being passed on to the subsequent discharge station, the tank 9 and glue pick-up/applicator rollers 10 are held away from the blank 1, whereas when the conveying drum 7 is in its pause phase, the tank 9 with rollers 7 moves towards it, bringing the rollers into contact with the blank (this position is marked 10' in FIG. 3), and then withdraws. The glue is thereby transferred to the desired areas of the blank 1 in a touching or punching movement rather than in a rolling or other such movement. This avoids the soiling caused both by the method of application to the blank 1 and by the centrifugal force acting on the glue lying on the surface of the rollers from which it can be scattered into the surrounding environment.

FIGS. 2 and 4 clearly show the correlations between the areas where the glue is applied to the blank and the disposition of the rollers 10. The glue is applied to areas at opposite ends of the blank, which is fed through with its longitudinal axis at right angles to the direction of advance, that is parallel with the axis of the conveying drums 7. Said areas are basically situated on the two opposite transverse tabs of the two ends 201 of the blank 1 and in the middle of the blank, between these two lateral areas 201, these opposite middle areas being marked 301. When the box is formed, that is once the blank 1 is folded, other associated tabs or parts of the blank 1 are folded on top of these areas 201 and 301.

As will be clear from the figures, the glue-carrying recesses 210 of the pick-up/applicator rollers 10 form on the corresponding area of glue application 201 and 301 of the blank 1 a row of dashes 101 of glue that lie with their longitudinal axis in the direction of advance and whose length is approximately equal to that of the glue-carrying recesses 210. For each area of application 201, 301 the dashes are superimposed on each other and the row of dashes extends transversely to the direction of advance of the blank. The glue-carrying recesses 210 therefore are of a circumferential length such that despite the curvature of the peripheral surface of the rollers 10, even glue situated at the circumferential extremities of these recesses is transferred to the blank. The length of the dashes of glue 101 on the blank 1 is therefore short, while the length of the imprint of glue transversely to the direction of travel is limited only by the dimensions of the blank, that is of the selected areas of application. Consequently, by feeding the blank 1 so that the glue application areas are oriented with their axes parallel with the longer sides of the rollers transversely to the direction of travel and parallel with the axes of the pick-up/applicator rollers 10, in a single touching or punching movement, it is possible to form imprints of glue of any length without using a painting or rolling action of the glue applicator means along the glue application areas 201, 301. The particular embodiment using rings of circumferentially elongated recesses with the individual rings aligned axially with each other thus makes it possible to subdivide the glue application area into separate individual strips to ensure that the glue is distributed better. Consequently, the glue does not spread and ooze out and cause soiling or the like when the tabs or flaps are folded over onto the glued area.

The invention is not of course limited to the embodiments described above and illustrated and can be greatly altered and modified, especially from the point of view of construction, without departing from the underlying principle set forth above and claimed below.

I claim:

1. An apparatus for applying glue to discrete wrapper sheets comprising:
  - a glue application station including a glue box with glue therein which glue is to be selectively applied at predetermined longitudinally spaced areas on each wrapper sheet;
  - a conveying means for conveying a succession of discrete wrapper sheets through said glue application station along a longitudinal direction of advance and for presenting each wrapper sheet at a rest position in said glue application station for application of glue thereto; and
  - a glue means for picking up glue from said glue box and applying the picked up glue with a transverse punching action to the predetermined longitudinally spaced areas of a presented wrapper sheet in the rest position, said glue means including
    - a plurality of adjacent contact members longitudinally spaced from one another which are brought into contact with the presented wrapper sheet to deposit glue thereon to the predetermined longitudinally spaced areas of the wrapper sheet, and
    - a moving means for simultaneously moving said plurality of adjacent contact members transversely to the predetermined longitudinally spaced areas of the presented wrapper sheet between an active position of glue application where said contact members are in punch contact with the predetermined areas of the presented wrapper sheet in the rest position and an inactive position where said contact members are transversely spaced from the presented wrapper sheet so that the presented wrapper sheet with glue applied thereto is conveyed by said conveying means from said glue application station and a successive wrapper sheet is presented by said conveying means in the rest position.

2. An apparatus for applying glue as claimed in claim 1: wherein each said contact member includes a plurality of discrete glue carrying portions on a surface thereof which said portions are limited to a predetermined width in the direction of advance of said conveying means and which said segments are limited to a length in a direction perpendicular to the direction of advance of said conveying means only by a size of the wrapper sheet.

3. An apparatus for applying glue as claimed in claim 2: wherein the direction of advance of said conveying means conveys is transverse to a length direction of said glue carrying portions.

4. An apparatus for applying glue as claimed in claim 3: wherein each said contact member of said glue means is a roller;

wherein said glue means further includes a rotating means for rotating each said roller stepwise about an axis transverse to the direction of advance of said conveying means; and wherein said glue carrying portions are sectors of said rollers, each said sector having an arcuate form following a peripheral surface of said roller and having a width in a circumferential direction such that when said sector is rotated and then traversely moved into punch contact with the presented wrapper sheet, the glue in said sector is transferred to the presented wrapper sheet during the punch contact.

5. An apparatus for applying glue as claimed in claim 4:

wherein each said sector produces an axial row of equally spaced dashes of glue on the presented wrapper sheet, wherein said sectors of each said roller are oriented in the direction of advance, and wherein each said sector has a predetermined length in the direction of advance.

6. An apparatus for applying glue as claimed in claim 5:

wherein each said sector is an axial row of recesses in a surface of an associated said roller, each said recess having a longitudinal dimension along a circumference of said roller.

7. An apparatus for applying glue as claimed in claim 6:

wherein each said roller includes a plurality of axial rows of recesses provided about a circumference thereof and equally spaced from one another, said recesses of adjacent rows being aligned axially along a ring about each said roller; and wherein said plurality of rollers have rings of recesses which are aligned axially with one another.

8. An apparatus for applying glue as claimed in claim 7:

wherein said conveying means presents the wrapper sheet at a position above said glue box;

wherein said rollers are provided between said glue box and the presented wrapper sheet and are partially immersed in the glue contained in said glue box;

wherein said moving means moves said rollers and said glue box as a unit, and said moving means moves said rollers to the active position in synchronization with the presenting of a successive wrapper sheet by said conveying means in the rest position.

9. An apparatus for applying glue as claimed in claim 8:

wherein said rotating means rotates said rollers together and between successive active positions such that for each successive wrapper sheet presented, a successive axial row of recesses with glue therein on each associated said roller is moved into punch contact with the successive wrapper sheet in the rest position.

10. An apparatus for applying glue as claimed in claim 9:

wherein said conveying means includes a drum on which the wrapper sheets are conveyed; and wherein said moving means includes an arm which is pivotally mounted at a pivot end and to which is attached said glue box at a box end, and a cam means which contacts said box end of said arm for moving said box end upwards and downwards relative to said drum and hence which moves said glue means between the active and inactive positions.

11. An apparatus for applying glue as claimed in claim 10:

wherein said rotating means includes a spindle on which at least one said roller is mounted for rotation therewith, said spindle being mounted to walls of said glue box, and a drive motor connected to said spindle to rotate said spindle and hence said roller.

12. An apparatus for applying glue as claimed in claim 11:

wherein said rotating means includes a plurality of spindles mounted to the walls of said glue box on which respective ones of said rollers are mounted for rotation.

13. An apparatus for applying glue as claimed in claim 12:

wherein said rollers extend only along a portion of a length of a respective said spindle at a predetermined axial position.

14. An apparatus for applying glue as claimed in claim 12:

wherein said rollers extend along substantially an entire length of a respective said spindle.

15. An apparatus for applying glue as claimed in claim 12:

wherein said spindles have longitudinal axes which are arranged along a portion of a cylinder having a longitudinal axis coaxial with a longitudinal axis of said drum.

16. An apparatus for applying glue as claimed in claim 15:

wherein said glue box includes a cover which is concavely shaped coaxially to said drum, said cover including slots through which said rollers partially extend radially.

* * * * *